United States Patent Office 2,848,443
Patented Aug. 19, 1958

2,848,443

ALKYL GALLATES AS SHORT STOPPING AGENTS FOR THE EMULSION POLYMERIZATION OF SYNTHETIC RUBBERS

Lawrence R. Sperberg, Borger, Tex., assignor to Phillips Petroleum Company, a corporation of Delaware No Drawing. Application June 22, 1953
Serial No. 363,389

3 Claims. (Cl. 260—84.3)

This invention relates to the modification of rubber products. In one aspect it relates to the termination of the polmerization reaction when the desired conversion has been reached by the use of novel shortstopping agents. In another aspect it relates to the modification of rubber so that the rubber products produced therefrom resist the destructive effect of oxidation, heat, and flex-cracking.

The term "rubber" used in the specification and claims of this disclosure refers to both natural rubbers and synthetic rubbers.

In the emulsion polymerization of monomeric materials, especially a butadiene-styrene mixture comprising a major portion of butadiene and a minor portion of styrene and similar comonomer systems, it is generally desirable to halt the reaction when a predetermined degree of conversion has been obtained. Such termination of the polymerization is usually effected by substances known as shortstopping agents, introduced into the reaction mixture when the desired conversion of monomers has been reached.

Among the stortstopping agents employed in the past, hydroquinone is widely known. Hydroquinone, however, is not without some drawbacks and use of this material in emulsion polymerization reaction leads to many difficulties. Among the disadvantages attributable to hydroquinone are failure to adequately terminate the polymerization and toxic properties which gives rise to a problem in the disposal of the serum residues after removal of the polymer.

Furthermore, hydroquinone is not a satisfactory shortstopping agent for terminating the polymerization reaction in the newer, low-temperature polymerization reactions recently adopted by the synthetic rubber industry.

Complete control of the degree of polymerization of the monomers provides improved finished rubber products.

Natural rubber after molding and vulcanization to produce the end rubber product is subject to deterioration by aging as a result of exposure to heat and oxidation. Among the various antioxidants or age resisting agents employed in rubber recipes for the protection of rubber products, phenyl-beta-naphthylamine is widely known. Phenyl-beta-naphthylamine is usually referred to as PBNA.

In at least one of the aspects of this invention, each of the following objects will be attained.

It is an object of this invention to provide a modifying agent for producing improved rubber products.

It is another object to provide a material for the termination of the polymerization reaction in the emulsion polymerization process for producing synthetic rubber.

It is still another object to provide a modifying agent which, when incorporated into rubber, will render the rubber resistant to the destructive effect of oxidation, heat, and flex-cracking.

Other objects will be apparent to one skilled in the art from the accompanying disclosure and discussion.

I have discovered that alkyl gallates and alkyl pyrogallates are excellent modifying agents for terminating the polymerization reaction in the emulsion polymerization process for producing synthetic rubber and are excellent antioxidants for finished rubber products. The alkyl radicals attached to the gallate and pyrogallate nuclei are preferably maintained in the range of 4 to 20 carbon atoms per alkyl radical.

Among the alkyl radicals applicable to this invention are tertiary butyl, isobutyl, n-butyl, isoamyl, n-amyl, dimethyl butyl, methyl amyl, isohexyl, n-hexyl, dimethyl amyl, trimethyl amyl, trimethyl butyl, tetramethyl butyl, methyl ethyl pentyl, isooctyl, n-octyl, isododecyl, n-dodecyl, and similar alkyl radicals.

The modifying agents of this invention can be prepared by the esterification of gallic acid and etherification of pyrogallol. Gallic acid is prepared on a large scale from tannic acid, which is derived from the bark of trees such as oak, tanbark, and quebracho. Upon heating, gallic acid loses carbon dioxide and forms pyrogallol. Thus these materials can be prepared from naturally occurring products and the expensive chemical synthesis of materials for antioxidants and shortstopping agents can be avoided. The alkyl gallates are preferred for the termination of the polymerization reaction when the newer low-temperature polymerization recipes are employed. Both the alkyl gallate and alkyl pyrogallate give satisfactory shortstopping action when used for the termination of the conventional high-temperature, e. g., 122° F., polymerization recipes.

The requirements for a shortstopping agent for use in the low-temperature polymerization are more astringent than are the requirements for the termination of the polymerization reaction conducted according to the conventional high-temperature recipes. I have found that the alkyl gallates, wherein the alkyl radical contains from 4 to 20 carbon atoms, is an excellent shortstopping agent when used to terminate the polymerization reaction in a synthetic rubber polymerization recipe carried out in the temperature range of −40 to 70° C. The alkyl gallates of my invention have been found to be superior to some of the recognized shortstopping agents presently used.

A hydroperoxide type catalyst is usually used in the low-temperature polymerization recipes and a persulfate type catalyst is usually used in the high-temperature polymerization recipes. At any rate a rapid catalyst is used to promote the polymerization process at the low temperatures employed in producing the new "cold rubber."

The modifying agents of my invention are used in amounts of 0.1 to 1.5 parts per hundred parts of rubber and preferably in amounts of 0.5 to 1 part per hundred parts of rubber.

I have also discovered that the alkyl gallates and alkyl pyrogallates, wherein the alkyl chain contains from 4 to 20 carbon atoms, are superior modifying agents for helping rubber products to resist the destructive effect of oxidation, heat, and flex-cracking. Although the beneficial effects of my modifying agents are more pronounced when employed in a natural rubber recipe, beneficial results are obtained when used in a synthetic rubber recipe. It is recognized by those skilled in the art that natural rubber products are more susceptible to aging from the effects of oxidation, heat, and flex-cracking than are the synthetic rubber products. The following examples demonstrate some of the advantages obtained by the use of my novel modified agents. These examples are intended to be illustrative and are not to be construed to narrow the scope of my invention.

EXAMPLE I

A rapid, sugar-free, low-temperature synthetic rubber recipe having the composition shown in Table I was used in the polymerization termination tests.

Table I

BUTADIENE-STYRENE RECIPE

| | |
|---|---|
| Butadiene/styrene | 75/25 |
| Water | 190 |
| Dresinate 214 (sodium resinate) | 5 |
| Daxad 11 (alkyl naphthalene sulfonic acid sodium salt) | 0.01 |
| Potassium hydroxide | 0.055 |
| Potassium chloride | 0.5 |
| Diox D (diisopropyl benzene hydroperoxide) | 0.128 |
| MTM (mixed tertiary mercaptans) | 0.25 |
| $K_4P_2O_7/FeSO_4.7H_2O$ | 0.198/0.167 |
| Temperature, °C | 5(41°F.) |
| Shortstop, p. h. m | 0.2 |
| Antioxidant, phenyl-beta-naphthylamine (percentage based on polymer) | 0.5 |

The tests were conducted by compounding the above recipe in separate bottles, each bottle being used to test one shortstopping agent. After 3 hours 0.2 p. h. m. of shortstop was added, then the system was held at 5° C. for about 23 hours. Next the bottles were placed in a 50° C. air bath and held there for approximately 24 hours. The samples taken for analysis were coagulated in ethanol containing phenyl-beta-naphthylamine as antioxidant. The results of these tests are tabulated in Table II.

Table II

SHORTSTOPPING DATA

| Material | Conv. Percent | | Gel. | | Samples Milled Three Passes Viscosity | |
|---|---|---|---|---|---|---|
| | Orig. | Aged | Orig. | Aged | Orig. | Aged |
| Dodecyl Gallate | 57 | 60 | 4 | 8 | 1.61 | 2.14 |
| Ditertiary Butyl Hydroquinone | 59 | 58 | 7 | 11 | ¹1.98 | ¹2.22 |
| Hydroquinone | 59 | 79 | 2 | 14 | 1.71 | 2.12 |
| None | 58 | 98 | 4 | 67 | | 1.24 |

¹ Not milled.

These data show that the alkyl gallates are excellent agents for the termination of the polymerization reaction in a low-temperature synthetic polymerization process. The particular recipe employed in these tests is recognized as a recipe which is particularly difficult to control with respect to continued polymerization and cross linkage after the desired degree of polymerization has been obtained.

EXAMPLE II

The results of tests wherein alkyl gallates and alkyl pyrogallates were used as antioxidants in a synthetic rubber recipe having the composition of the synthetic rubber of Table I are tabulated in Table III.

Table III

BUTADIENE-STYRENE RUBBER WITH ANTIOXIDANTS 30 MINUTES CURE AT 307° F.

| | None | PBNA | Dodecyl Gallate | Dodecyl Pyrogallate |
|---|---|---|---|---|
| Unaged Samples: | | | | |
| Stress-strain properties, 80° F.— | | | | |
| Tensile (p. s. i.) | 2,325 | 2,230 | 2,185 | 2,485 |
| Elongation (percent) | 375 | 350 | 345 | 390 |
| Stress-strain properties, 200° F.— | | | | |
| Tensile (p. s. i.) | 820 | 600 | 1,250 | 1,280 |
| Hysteresis, ΔT, ° F | 86.2 | 78.0 | 82.2 | 81.4 |
| Resilience, percent | 62.8 | 59.3 | 59.1 | 60.0 |
| Flex-life, thousands of flexures to failure | 4.0 | 5.1 | 3.8 | 3.2 |
| Oven-aged 24 hours at 212° F.: | | | | |
| Stress-strain properties, 80° F.— | | | | |
| Tensile (p s i.) | 1,950 | 2,370 | 2,400 | 2,300E |
| Elongation (percent) | 225 | 260 | 260 | 240E |
| Hysteresis, ΔT, ° F | 73.6 | 70.3 | 71.6 | 68.3 |
| Resilience, percent | 66.3 | 64.2 | 63.7 | 64.5 |
| Flex-life, thousands of flexures to failure | 1.0 | 1.4 | 1.6 | 1.1 |

E=estimated.

These results show that the alkyl gallates and pyrogallates give added protection to synthetic rubber against age.

In the above Example II, the synthetic rubber was compounded for the physical tests according to the recipe shown in Table IV.

Table IV

| | Parts by weight |
|---|---|
| Polymer | 100 |
| Philblack O | 50 |
| Zinc oxide | 5 |
| Stearic acid | 1 |
| Rubber softeners | 5 |
| Sulfur | 1.75 |
| Santocure | 1.0 |

EXAMPLE III

Alkyl gallates and alkyl pyrogallates were tested as antioxidants in a natural rubber recipe having the compounding composition shown in Table V.

Table V

| No. 1: | Parts by weight |
|---|---|
| Smoked sheets | 100 |
| Philblack O | 50 |
| Zinc oxide | 4 |
| Stearic acid | 3 |
| Sulfur | 2 |
| Pine tar | 3 |
| Santocure | 0.5 |
| Antioxidant | 0.1, 0.5, 1.0 |

The results of test on natural rubber recipe having a composition of the recipe of Table V are tabulated in Table VI.

Table VI

NATURAL RUBBER WITH ANTIOXIDANTS 30 MINUTES CURE AT 307° F.

| | Antioxidant, parts/100 parts Rubber | | | | | | | |
|---|---|---|---|---|---|---|---|---|
| | Dodecyl Gallate | | Dodecyl Pyrogallate | | Flexamine | | Phenyl-$\beta$-Naphthylamine | |
| | 0.5 | 1.0 | 0.5 | 1.0 | 0.5 | 1.0 | 0.5 | 1.0 |
| Unaged Samples: | | | | | | | | |
| Stress-strain properties, 80° F.— | | | | | | | | |
| Tensile (p. s. i.) | 3,950 | 3,890 | 3,940 | 3,980 | 3,970 | 4,160 | 4,110 | 3,980 |
| Elongation (percent) | 525 | 540 | 535 | 560 | 515 | 560 | 520 | 530 |
| Hysteresis, $\Delta T$, °F | | | | | | | | |
| Resilience, percent | 76.3 | 73.7 | 76.6 | 75.0 | 75.0 | 74.8 | 75.9 | 75.5 |
| Flex-life, thousands of flexures to failure | | | | | | | | |
| Oven-aged 24 hours at 212° F: | | | | | | | | |
| Stress-strain properties, 80° F.— | | | | | | | | |
| Tensile (p. s. i.) | 2,740 | 2,660 | 2,730 | 2,825 | 3,200E | 3,125 | 2,910 | 2,880 |
| Elongation (percent) | 400 | 385 | 390 | 425 | 420E | 395 | 390 | 390 |
| Hysteresis, $\Delta T$, °F | 37.5 | 37.8 | 36.1 | 37.5 | 36.5 | 37.8 | 37.8 | 36.8 |
| Resilience, percent | 76.8 | 75.5 | 76.0 | 76.4 | 75.1 | 75.6 | 74.5 | 75.9 |
| Flex-life, percent broken at 50,000 flexures | 27.3 | 9.3 | 13.8 | 10.8 | 10.7 | 9.3 | 44.0 | 14.3 |

E = estimated.

The results of these tests show that the alkyl gallates and alkyl pyrogallates of this invention are superior antioxidants for use in natural rubber.

Variations and modifications are possible within the scope of the disclosure of this invention, the essence of which is that alkyl gallates and alkyl pyrogallates have been found to be excellent shortstopping agents for the emulsion polymerization of synthetic rubber and have been found to be excellent antioxidants for both synthetic and natural rubber.

I claim:

1. In the production of a synthetic rubber by the polymerization in aqueous emulsion of a monomeric material comprising a major portion of butadiene and a minor portion of styrene using a mercaptan as a polymer modifier and a hydroperoxide catalyst at a temperature in the range of —40 to 70° C., the improvement which comprises adding to the aqueous emulsion, when between 50 and 80 percent of said monomeric material is polymerized, dodecyl gallate in an amount of 0.1 to 1.5 parts per 100 parts of monomer so as to terminate said polymerization.

2. In the production of a synthetic rubber by the polymerization in aqueous emulsion of a monomeric material comprising a major portion of butadiene and a minor portion of styrene using a persulfate catalyst at a temperature of about 50° C., the improvement which comprises adding to the reaction mixture, when between 50 and 80 percent of said monomeric material is polymerized, dodecyl gallate in an amount of 0.1 to 1.5 parts per 100 parts of monomer so as to terminate said polymerization.

3. In the production of a synthetic rubber by polymerization in aqueous emulsion of a monomeric material comprising a major portion of butadiene and minor portion of styrene, the improvement which comprises adding to the aqueous emulsion, when between 50 and 80 percent of said monomeric material is polymerized, an alkyl gallate wherein the alkyl radical contains from 4 to 20 carbon atoms, in an amount of 0.1 to 1.5 parts per 100 parts of monomer so as to terminate said polymerization.

References Cited in the file of this patent

UNITED STATES PATENTS

| | | |
|---|---|---|
| 1,884,559 | Calcott et al. | Oct. 25, 1932 |
| 1,889,825 | Fessel | Dec. 6, 1932 |
| 2,133,297 | Jones | Oct. 18, 1938 |
| 2,255,191 | Sabalitschka et al. | Sept. 9, 1941 |
| 2,255,483 | D'Alelio | Sept. 9, 1941 |
| 2,595,221 | Ault | May 6, 1952 |
| 2,656,324 | Te Grotenhuis | Oct. 20, 1953 |

FOREIGN PATENTS

| | | |
|---|---|---|
| 269,745 | Great Britain | Apr. 28, 1927 |

OTHER REFERENCES

Smith et al.: "Industrial and Engineering Chemistry," pp. 691–694, July 1926.

Bergel: "Chemistry and Industry," pp. 127–128, April 1, 1944.